(12) United States Patent
Kim (10) Patent No.: US 11,623,583 B2
(45) Date of Patent: Apr. 11, 2023

(54) STRUCTURE FOR MOUNTING ELECTRONIC SOUND GENERATOR IN VEHICLE

(71) Applicants: HYUNDAI MOTOR COMPANY, Seoul (KR); KIA MOTORS CORPORATION, Seoul (KR)

(72) Inventor: Ki Chang Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 286 days.

(21) Appl. No.: 17/141,665

(22) Filed: Jan. 5, 2021

(65) Prior Publication Data

US 2022/0032855 A1 Feb. 3, 2022

(30) Foreign Application Priority Data

Aug. 3, 2020 (KR) .......................... 10-2020-0096847

(51) Int. Cl.
*B60R 11/02* (2006.01)
*B60R 11/00* (2006.01)

(52) U.S. Cl.
CPC ....... *B60R 11/02* (2013.01); *B60R 2011/0005* (2013.01)

(58) Field of Classification Search
CPC ............. B60R 11/02; B60R 2011/0005; B60R 11/0217; B60Q 5/008; B62D 25/081; G10K 15/04; H04R 1/028; H04R 2499/13; B60Y 2306/11
USPC ........................................................ 296/24.34
See application file for complete search history.

(56) References Cited

U.S. PATENT DOCUMENTS

| | | | |
|---|---|---|---|
| 9,764,687 B2 * | 9/2017 | Okuyama | ............ H04R 1/2811 |
| 2019/0092231 A1 * | 3/2019 | Lee | ........................... G10K 9/20 |

FOREIGN PATENT DOCUMENTS

| | | | | |
|---|---|---|---|---|
| CN | 108349547 A | * | 7/2018 | ............. B62D 25/08 |
| CN | 210652915 U | * | 6/2020 | ............... B60Q 5/00 |
| KR | 10-2013-0142492 A1 | | 12/2013 | |

* cited by examiner

*Primary Examiner* — Pinel E Romain
(74) *Attorney, Agent, or Firm* — Lempia Summerfield Katz LLC

(57) ABSTRACT

A structure for mounting an electronic sound generator (ESG) in a vehicle includes: an ESG located inside a cowl space of a vehicle body; and a mounting bracket formed to fix the ESG to members defining the cowl space. In particular, the mounting bracket includes a plurality of fixation parts fixed to the members defining the cowl space and a mounting part to which the ESG is fixed.

13 Claims, 11 Drawing Sheets

STRUCTURE FOR MOUNTING ELECTRONIC SOUND GENERATOR IN VEHICLE

CROSS REFERENCE TO RELATED APPLICATION

This application claims priority to and the benefit of Korean Patent Application No. 10-2020-0096847, filed on Aug. 3, 2020, the entire contents of which are incorporated herein by reference.

FIELD

The present disclosure relates to a technique for mounting an electronic sound generator to a vehicle.

BACKGROUND

The statements in this section merely provide background information related to the present disclosure and may not constitute prior art.

Recent high-performance vehicles generate artificial sound, thereby improving the quality of auditory sensation such as sportiness or power of the vehicles.

In order to generate sound having a specific purpose as described above, an electronic sound generator (ESG) is provided and is driven by a controller to generate an appropriate sound suitable for the driving state of the vehicle.

How and where to install the electronic sound generator (hereinafter, referred to as "ESG") in the vehicle body is a very important factor for determining how the generated sound and vibration are transmitted to the driver. If the mounting structure thereof is inappropriate, it may cause unnecessary noise and vibrations due to interference with the surrounding components, thereby resulting in adverse effects.

The above description is presented as technical background information of the disclosure only to assist with an understanding of the background of the present disclosure, and no determination has been made as to whether any of the above might be applicable as prior art by those skilled in the art.

SUMMARY

The present disclosure provides a structure for mounting an electronic sound generator in a vehicle, which is capable of appropriately mounting an ESG to a vehicle body so as to appropriately provide a targeted virtual sound to the passengers, prevent interference with surrounding components or unnecessary inducement of vibrations, thereby minimizing the side effects of the ESG and maximizing the usefulness thereof, and ultimately greatly improving the marketability of the vehicle.

In one form of the present disclosure, a structure for mounting an electronic sound generator in a vehicle may include: an ESG located inside a cowl space of a vehicle body; and a mounting bracket formed to fix the ESG to members defining the cowl space, wherein the mounting bracket includes a plurality of fixation parts fixed to the members and a mounting part to which the ESG is fixed, and wherein the fixation parts of the mounting bracket are fixed to a position corresponding to one side of a virtual restriction wall obtained by extending, along a longitudinal direction of the cowl space, a view volume formed by perpendicularly projecting the ESG to an inner surface of the cowl space along a vibration direction, in which the ESG fixed to the mounting part vibrates and generates a target sound, so as not to overlap the virtual restriction wall.

The cowl space may be formed by a lower cowl panel providing a valley-shaped cross-section that forms a water channel at a lower portion thereof, an upper cowl panel connected to a rear upper portion of the lower cowl panel so as to support a lower portion of a windshield glass, and an upper cowl cover connected to a front upper portion of the lower cowl panel so as to support a bottom end of the windshield glass, and the fixation parts of the mounting bracket may be fixed to the upper cowl panel and the lower cowl panel.

The fixation parts of the mounting bracket may include a first fixation part fixed to the upper cowl panel and a second fixation part fixed to the lower cowl panel, and the mounting part of the mounting bracket may be formed to extend from the first fixation part to the front of the vehicle body.

An inclined part may be provided between the first fixation part and the mounting part of the mounting bracket so as to position the mounting part below the first fixation part, thereby forming a space above the mounting part, and the inclined part may have a plurality of beads formed to increase rigidity between the mounting part and the first fixation part.

An upper surface of the first fixation part of the mounting bracket may be bonded to a lower surface of the upper cowl panel, and the second fixation part of the mounting bracket may be bonded to a front surface of a rear wall that constitutes the water channel of the lower cowl panel.

The first fixation part and the second fixation part of the mounting bracket may be linearly connected by a linear support part while maintaining a same cross-section of the linear support part.

An extension support part may be provided between the linear support part and the inclined part of the mounting bracket, which is formed by extending the area of a portion where the linear support part and the inclined part meet, in order to suppress bending of the mounting part with respect to the linear support part.

In another form of the present disclosure, a structure for mounting an electronic sound generator in a vehicle may include: a lower cowl panel having a valley-shaped cross-section that forms a water channel; an upper cowl panel connected to a rear upper portion of the lower cowl panel so as to support a lower portion of a windshield glass; an upper cowl cover connected to a front upper portion of the lower cowl panel so as to support a bottom end of the windshield glass, and forming a closed cross-section together with the lower cowl panel and the upper cowl panel; an ESG fixed to be positioned within the closed cross-section; and a mounting bracket fixed to a rear wall of the lower cowl panel forming the water channel and a lower surface of the upper cowl panel so as to fix the position of the ESG within the closed cross-section.

The mounting bracket may include a first fixation part fixed to the upper cowl panel, a second fixation part fixed to the lower cowl panel, and a mounting part for fixing the ESG, which are integrally formed.

The first fixation part and the second fixation part of the mounting bracket are fixed only to a position corresponding to one side of a virtual restriction wall obtained by extending, along the longitudinal direction of a cowl, a view volume formed by perpendicularly projecting the ESG to the inner surface of the closed cross-section along the vibration direction of the ESG so as not to cross or overlap the virtual restriction wall.

The first fixation part and the second fixation part of the mounting bracket may be connected by a linear support part that linearly connects the same.

An inclined part may be provided between the first fixation part and the mounting part of the mounting bracket so as to position the mounting part below the first fixation part, thereby forming a space above the mounting part.

An extension support part may be provided between the linear support part and the inclined part of the mounting bracket, which is formed by extending the area of a portion where the linear support part and the inclined part meet, in order to suppress bending of the mounting part with respect to the linear support part.

The present disclosure makes it possible to appropriately mount the ESG to a vehicle body so as to appropriately provide a targeted virtual sound to the passengers and to prevent interference with surrounding components or unnecessary inducement of vibrations, thereby minimizing the side effects of the ESG, maximizing the usefulness thereof, and eventually greatly improving the marketability of the vehicle.

In particular, the present disclosure is able to prevent the ESG from interfering with and coming into contact with an adjacent upper cowl panel due to in-phase vibration, thereby fundamentally preventing the occurrence of unnecessary noise and vibrations.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 to 7, a structure for mounting an electronic sound generator in a vehicle according to the present disclosure is configured to include an electronic sound generator (ESG) 3 located within a cowl space 1 of a vehicle body and a mounting bracket 5 formed to fix the ESG 3 to the members constituting the cowl space 1.

The mounting bracket 5 includes a plurality of fixation parts fixed to members constituting the cowl space 1 and a mounting part to which the ESG 3 is fixed. The fixation parts of the mounting bracket 5 are fixed to a position corresponding to one side of a virtual restriction wall (RW) obtained by extending, along the longitudinal direction of the cowl space, a view volume (VV) formed by perpendicularly projecting the ESG 3 to the inner surface of the cowl space 1 along a vibration direction, in which the ESG 3 fixed to the mounting part vibrates in order to generate a target sound, so as not to overlap the restriction wall (RW).

Figure 5:
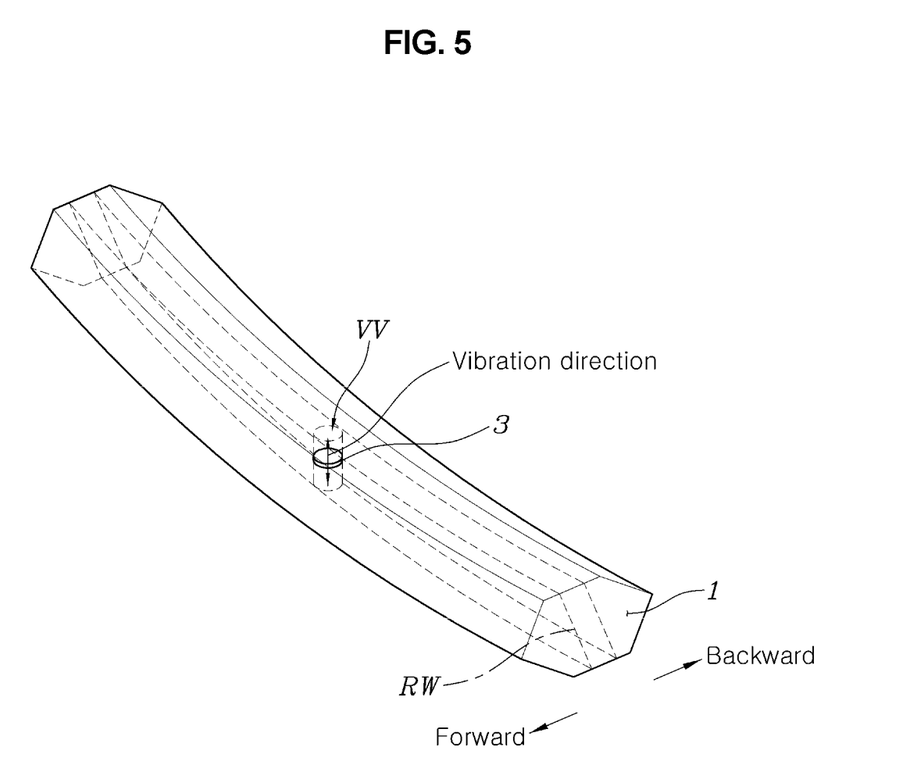
FIG. 5 is a view explaining the view volume and the restriction wall in one form of the present disclosure.

FIG. 5 conceptually illustrates the view volume (VV) and the restriction wall (RW). Assuming that the cowl space 1 is simplified into a three-dimensional structure obtained by extending a hexagonal cross-section as shown in FIG. 5, a view volume (VV) is formed by perpendicularly projecting the ESG 3 upwards and downwards along the vibration direction thereof, and then a virtual restriction wall (RW) having a rectangular cross-section is formed by extending the view volume (VV) along the longitudinal direction of the cowl space 1, as shown in the drawing.

In one form, the fixation parts of the mounting bracket 5 are fixed only to one side of the restriction wall (RW) formed as described above, and as shown in FIG. 1, all of the fixation parts of the mounting bracket 5 are fixed to the rear side of the restriction wall (RW).

Figure 1:
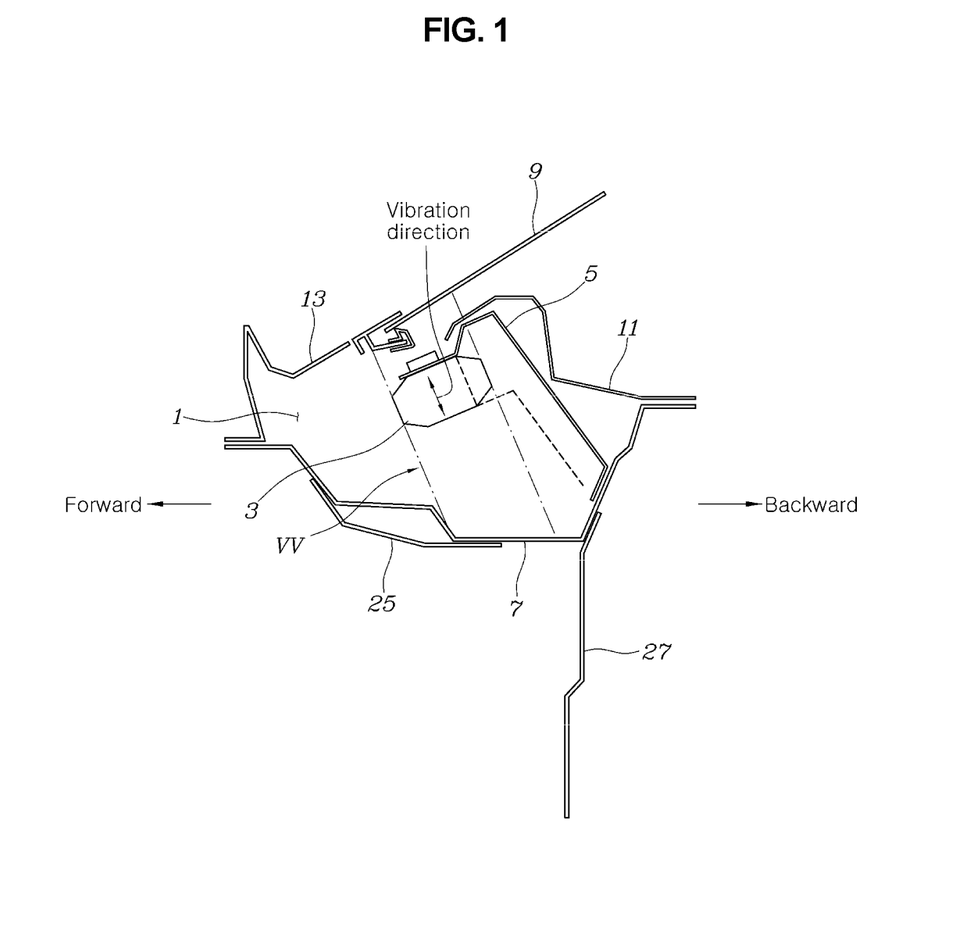
FIG. 1 is a cross-sectional view illustrating a structure for mounting an electronic sound generator to a vehicle according to one form of the present disclosure.
Figure 2:
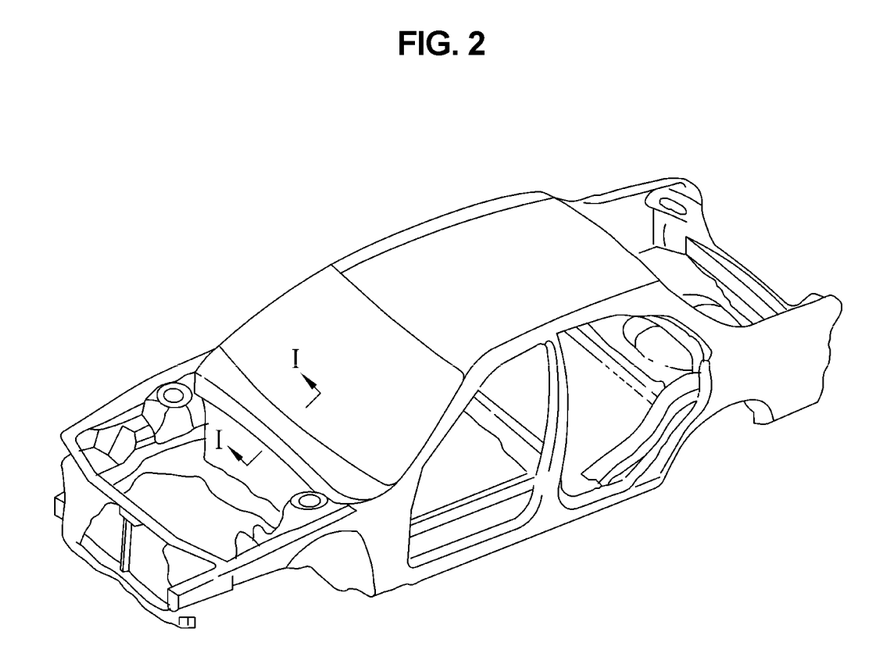
FIG. 2 is a view showing the position in the vehicle body from which the cross-sectional view in FIG. 1 is taken.
Figure 3:
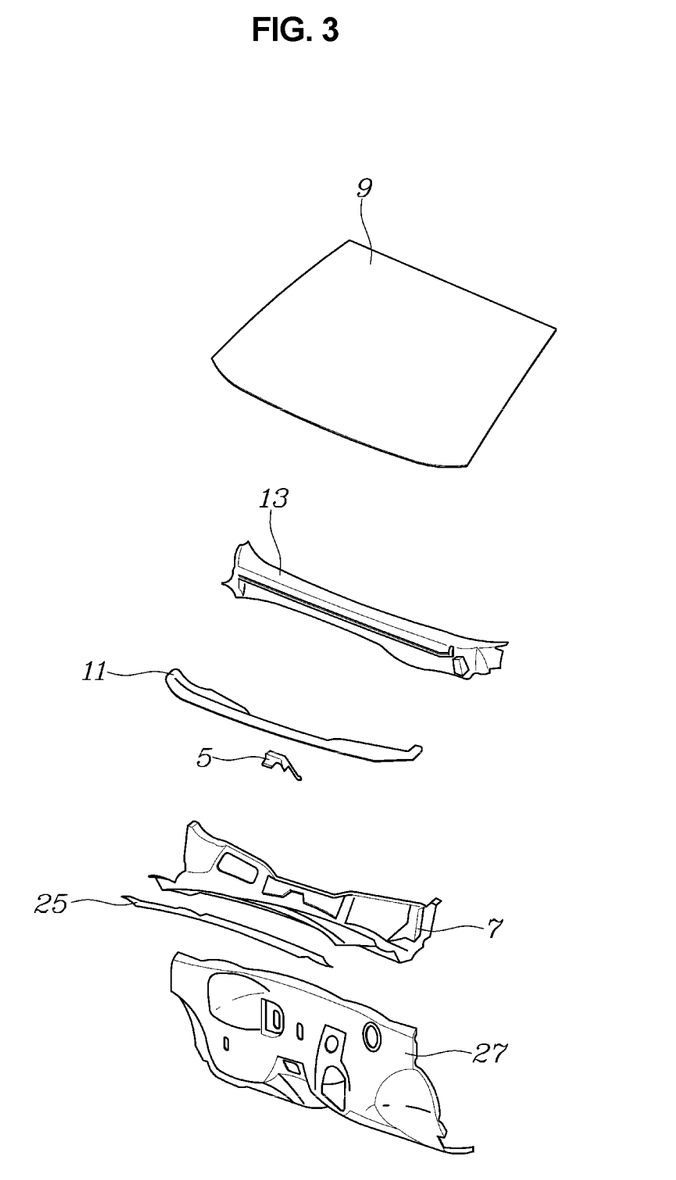
FIG. 3 is an exploded perspective view illustrating primary components shown in FIG. 1.
Figure 4:
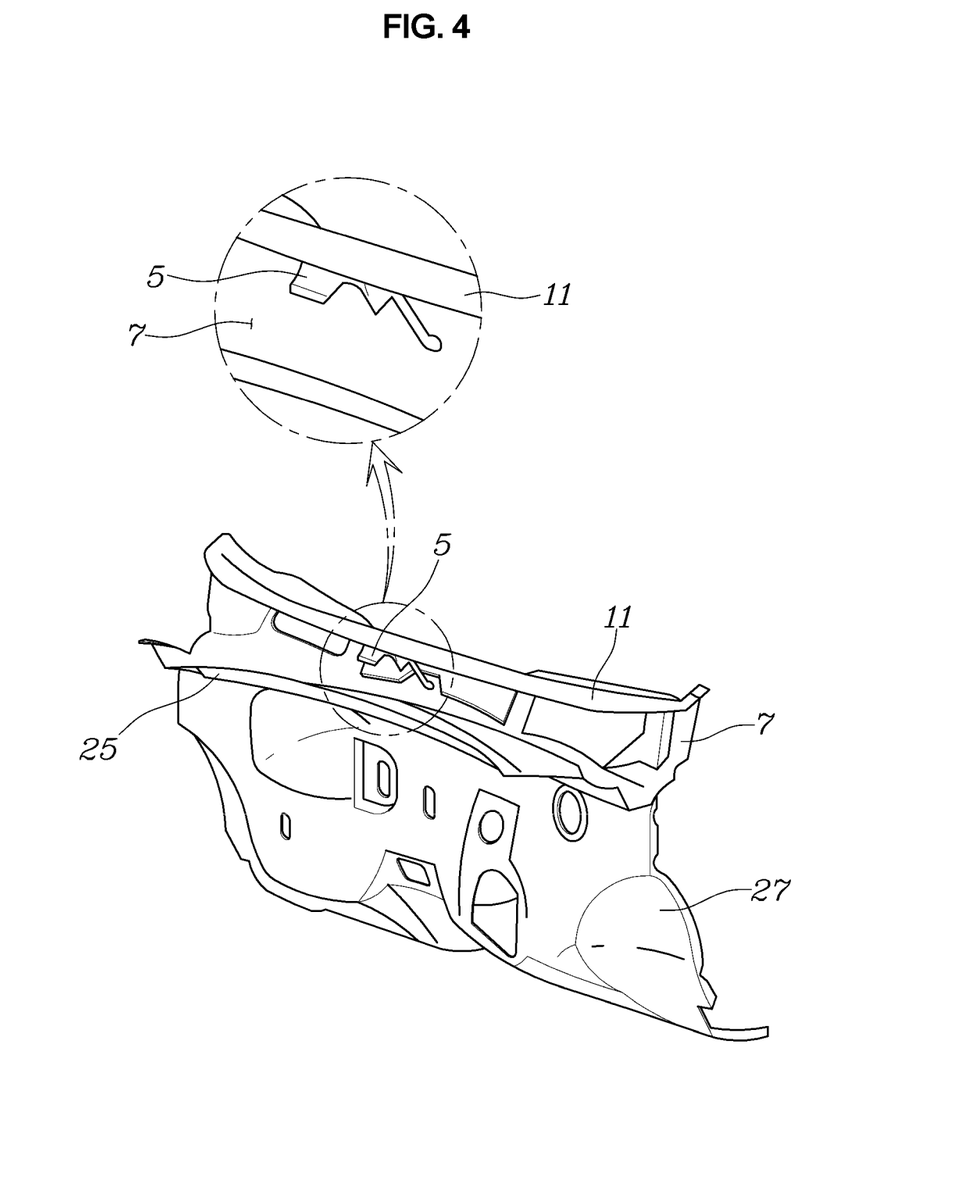
FIG. 4 is a perspective view illustrating the structure shown in FIG. 1.

As described above, if all of the fixation parts of the mounting bracket 5 supporting the ESG 3 are fixed only to one side of the restriction wall (RW) without crossing or overlapping the same, the members constituting the cowl space 1 and the ESG 3 vibrate in phase with each other due to excitation of the ESG 3, so that the ESG 3 does not come into contact with the members constituting the cowl space 1 or does not interfere with the same, thereby preventing the occurrence of unnecessary noise.

The cowl space 1 is formed by a lower cowl panel 7 providing a valley-shaped cross-section that forms a water channel at the lower portion thereof, an upper cowl panel 11 connected to the rear upper portion of the lower cowl panel 7 so as to support the lower portion of the windshield glass 9, and an upper cowl cover 13 connected to the front upper portion of the lower cowl panel 7 so as to support the bottom end of the windshield glass 9, and the fixation parts of the mounting bracket 5 are fixed to the upper cowl panel 11 and the lower cowl panel 7.

In the case of rain, the cowl functions as a water channel through which water flowing down from the windshield glass 9 is easily discharged to both sides of the vehicle body, and the cross-sectional shape of the lower cowl panel 7 primarily enables the function of the water channel.

Figure 6:
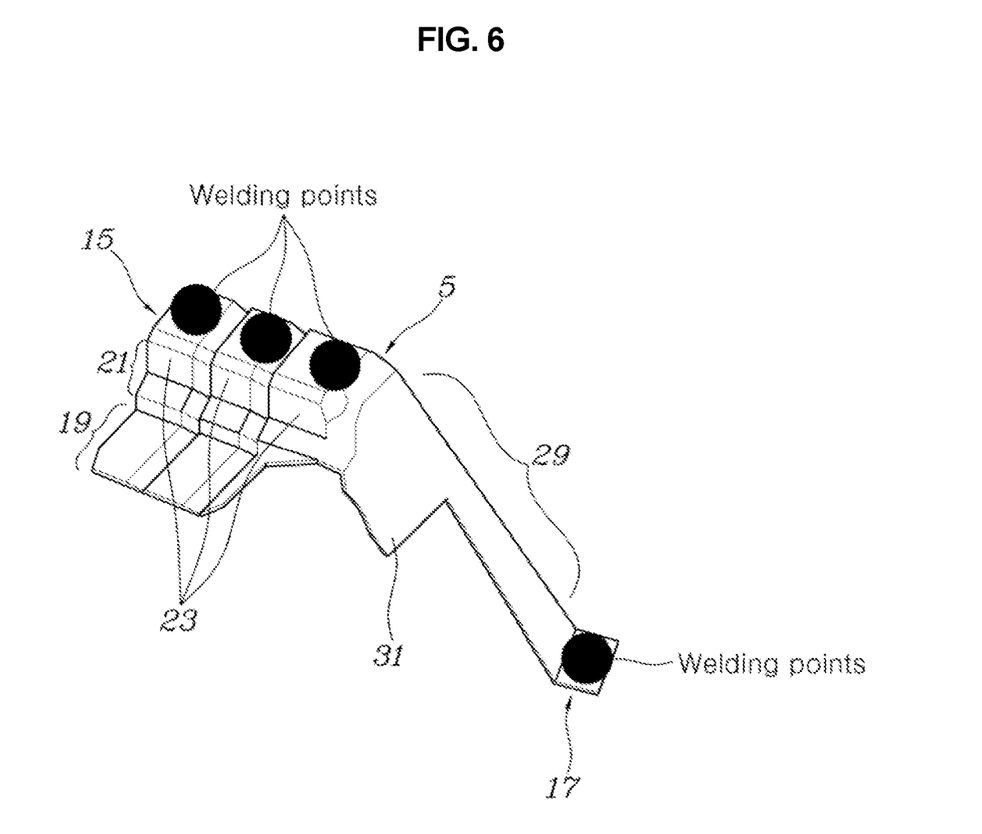
FIG. 6 is a perspective view illustrating the details of the mounting bracket shown in FIG. 1.

The fixation parts of the mounting bracket 5 include a first fixation part 15 fixed to the upper cowl panel 11 and a second fixation part 17 fixed to the lower cowl panel 7, and the mounting part 19 of the mounting bracket 5 is formed in a shape extending from the first fixation part 15 to the front of the vehicle body.

In addition, an inclined part 21 is provided between the first fixation part 15 and the mounting part 19 of the mounting bracket 5 so as to position the mounting part 19 below the first fixation part 15, thereby forming a space above the mounting part 19, and the inclined part 21 has a plurality of beads 23 formed to increase rigidity between the mounting part 19 and the first fixation part 15.

Therefore, the mounting bracket 5 supports the ESG 3 above the water channel in the cowl space 1 so as not to interfere with the upper cowl panel 11 or the upper cowl cover 13 or so as not to come into contact therewith, and effectively suppresses bending or vibration of the mounting bracket 5 due to excitation of the ESG 3.

The upper surface of the first fixation part 15 of the mounting bracket 5 is bonded to the lower surface of the upper cowl panel 11, and the second fixation part 17 of the mounting bracket 5 is bonded to the front surface of a rear wall that constitutes the water channel of the lower cowl panel 7.

The first fixation part 15 and the second fixation part 17 of the mounting bracket 5 are bonded using a method such as welding or the like, and it is preferable to eliminate the possibility of occurrence of noise due to loosening of the fixation parts according to aging.

Figure 7:
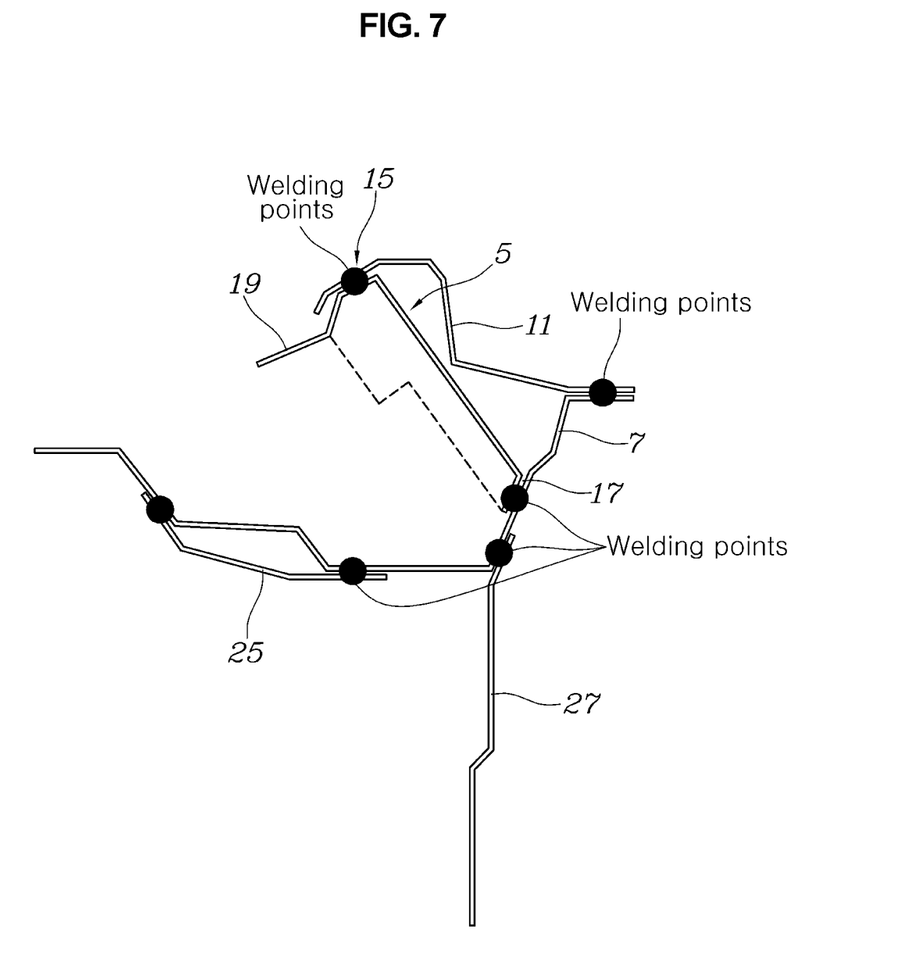
FIG. 7 is a view showing the positions where the mounting bracket is bonded from the perspective of FIG. 1.

For reference, FIGS. 6 and 7 show welding points between the portions of the mounting bracket 5 to be welded and the members constituting the cowl space 1, and FIG. 7 shows a reinforcement member 25 for reinforcing the lower portion of the lower cowl panel 7, a dash panel 27 connected to the rear lower portion of the lower cowl panel 7, and welding points thereof, in addition to the members forming the cowl space 1.

The first fixation part 15 and the second fixation part 17 of the mounting bracket 5 are connected by a linear support part 29 that has a specific cross-section and linearly connects the same. In one form, the first fixation part 15 and the second fixation part 17 of the mounting bracket 5 are linearly connected by the linear support part 29 while the linear support part 29 maintains the same cross-section.

An extension support part 31, which is formed by extending the area of a portion at which the linear support part 29 and the inclined part 21 of the mounting bracket 5 meet, is provided between the linear support part 29 and the inclined part 21 in order to suppress bending of the mounting part 19 with respect to the linear support part 29.

Therefore, it is possible to effectively suppress bending vibration between the mounting part 19 and the linear support part 29 of the mounting bracket 5 due to excitation of the ESG 3 provided in the mounting part 19 of the mounting bracket 5.

Figure 8:
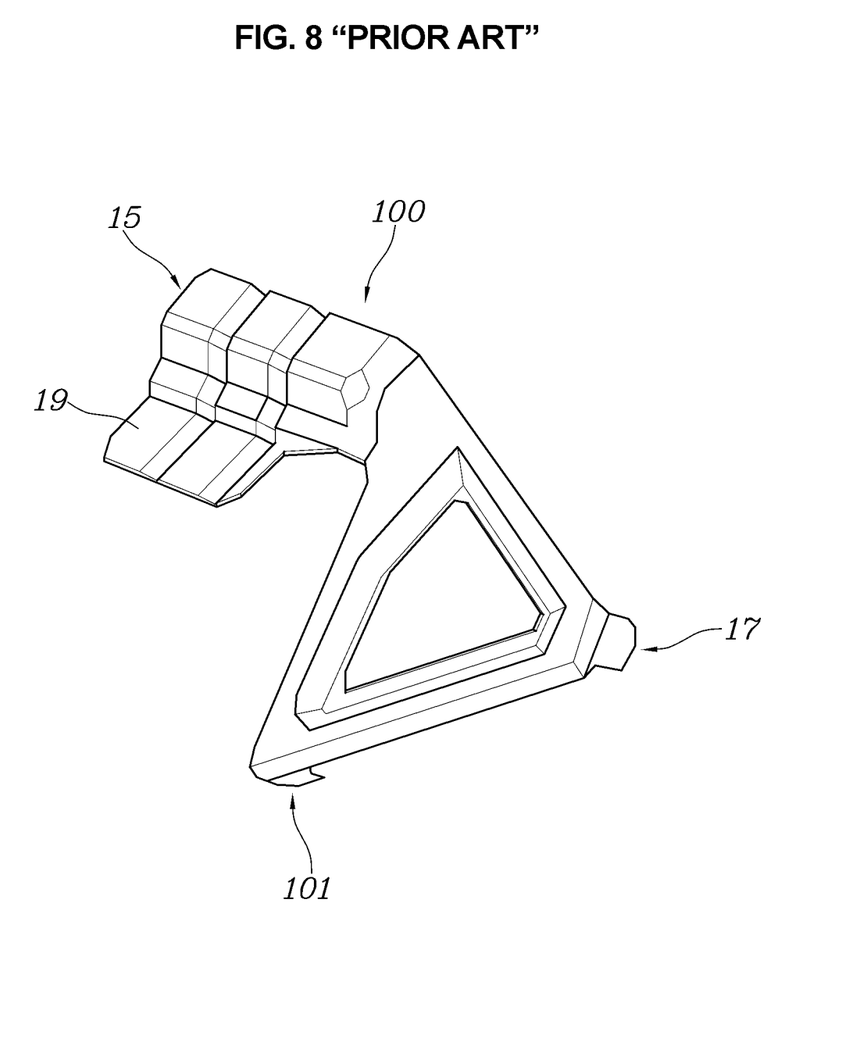
FIG. 8 is a view illustrating an incorrect example of a mounting bracket according to the prior art.
Figure 9:
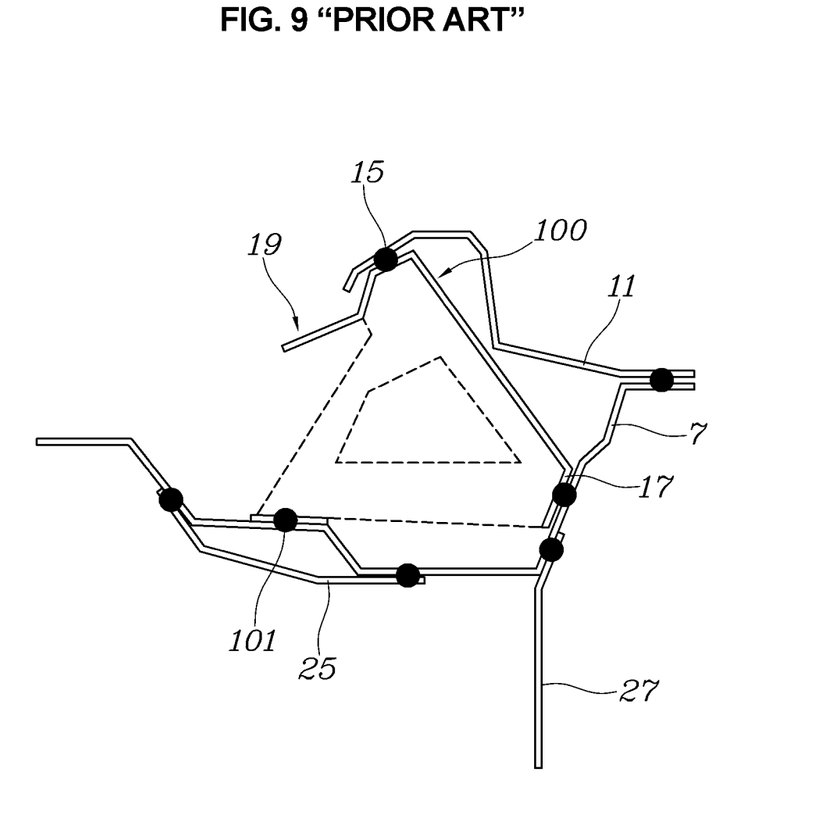
FIG. 9 is a view illustrating the state in which the ESG is fixed using the mounting bracket shown in FIG. 8 from the perspective of FIG. 7.

For reference, unlike the present disclosure, FIGS. 8 and 9 illustrate an incorrect example that may easily occur when trying to fix the ESG using a mounting bracket, wherein a third fixation part 101 is provided in a mounting bracket 100.

That is, the mounting bracket 100 in FIG. 8 further includes the third fixation part 101 in addition to the mounting part 19, the first fixation part 15, and the second fixation part 17, which are similar parts to those of the present disclosure shown in FIG. 6 and are denoted by the same names and reference numerals.

FIG. 9 shows the state in which the mounting bracket 100 shown in FIG. 8 is disposed in the cowl space 1 and supports the ESG 3, and at a glance it appears as though this configuration were superior because the ESG 3 is more securely fixed by the third fixation part 101. However, this configuration actually causes vibration of the members constituting the cowl space 1 due to excitation of the ESG 3 and the vibration of the ESG 3, which are to be generated in reverse phases, so the upper cowl cover 13 or the upper cowl panel 11, which are provided in the upper portion, among the members constituting the cowl space 1, come into contact with and interfere with the ESG 3, thereby generating unnecessary noise.

That is, the mounting bracket 100 in FIG. 8 has a structure in which the third fixation part 101 is provided across the restriction wall (RW) from the second fixation part 17 in the present disclosure, and the structure is more likely to generate unnecessary noise other than a targeted virtual sound when generating the target sound by driving the ESG 3 because vibrations occur in reverse phases between the ESG 3 and the members constituting the cowl space 1 when the members constituting the cowl space 1 vibrate due to excitation of the ESG 3.

Figure 10:
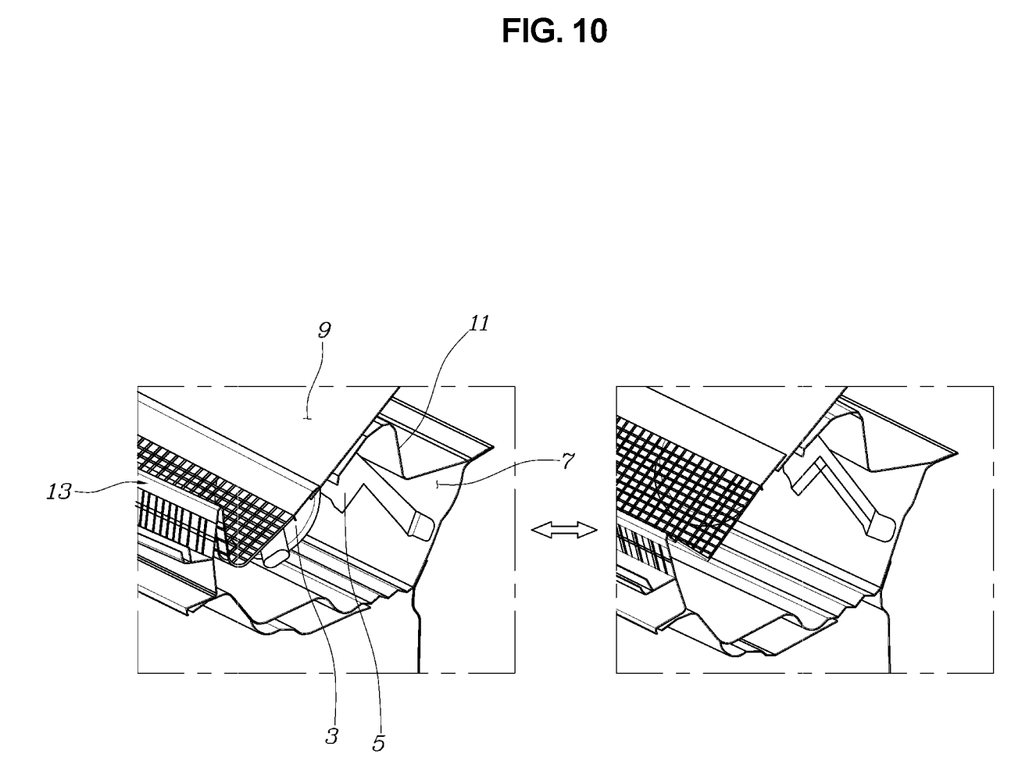
FIG. 10 is a view illustrating a simulation result in the case where the ESG mounting structure in one form of the present disclosure is applied.

FIG. 10 is a view illustrating a result of simulating the vibration of the cowl space 1 generated by excitation of the ESG 3 in the case where a structure of mounting the ESG 3 according to one form of the present disclosure is applied, and the two states shown in the drawing respectively indicate the two states of maximum amplitude of in-phase vibrations.

It can be seen that the ESG 3 does not interfere with or come into contact with other components in the above two maximum-amplitude states, as well as in the states therebetween, so that noise other than the targeted virtual sound does not occur when driving the ESG 3.

Figure 11:
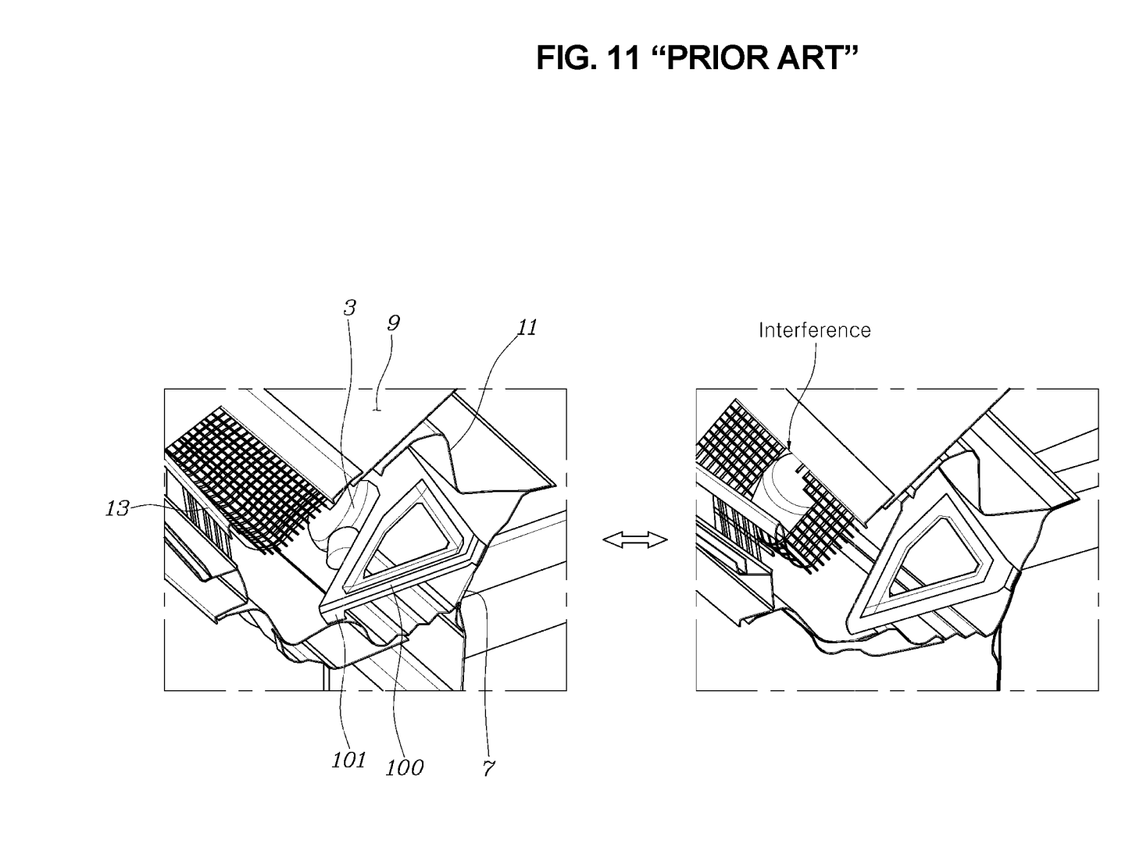
FIG. 11 is a view illustrating a simulation result in the case where the mounting bracket shown in FIG. 8 is used.

On the other hand, FIG. 11 is a view illustrating a result of simulating the vibration of the cowl space 1 generated by excitation of the ESG 3 in the case where the mounting bracket 100 shown in FIG. 8 is applied, and the two states shown in the drawing respectively indicate the two states of maximum amplitude of reverse-phase vibrations. It can be seen that the ESG 3 interferes with the upper cowl cover 13, so that noise may occur due to contact and interference between the ESG 3 and the upper cowl cover 13, as well as the targeted virtual sound, when driving the ESG 3.

The present disclosure described above may also be expressed as follows.

That is, the present disclosure is configured to include a lower cowl panel 7 having a valley-shaped cross-section that forms a water channel; an upper cowl panel 11 connected to a rear upper portion of the lower cowl panel 7 so as to support a lower portion of a windshield glass 9; an upper cowl cover 13 connected to a front upper portion of the lower cowl panel 7 so as to support a bottom end of the windshield glass 9, and forming a closed cross-section together with the lower cowl panel 7 and the upper cowl panel 11; an ESG 3 fixed to be positioned within the closed cross-section; and a mounting bracket 5 fixed to a rear wall of the lower cowl panel 7 forming the water channel and a lower surface of the upper cowl panel 11 so as to fix the position of the ESG 3 within the closed cross-section.

The mounting bracket 5 may be configured to include a first fixation part 15 fixed to the upper cowl panel 11, a second fixation part 17 fixed to the lower cowl panel 7, and a mounting part 19 fixing the ESG 3, which are integrally formed.

The first fixation part 15 and the second fixation part 17 of the mounting bracket 5 may be fixed only to one side of a virtual restriction wall (RW) obtained by extending, along the longitudinal direction of a cowl, a view volume (VV) formed by perpendicularly projecting the ESG 3 to an inner surface of the closed cross-section along the vibration direction of the ESG 3 so as not to cross or overlap the virtual restriction wall (RW).

The first fixation part 15 and the second fixation part 17 of the mounting bracket 5 may be connected by a linear support part 29 that linearly connects the same.

An inclined part 21 may be provided between the first fixation part 15 and the mounting part 19 of the mounting bracket 5 so as to position the mounting part 19 below the first fixation part 15, thereby forming a space above the mounting part 19.

An extension support part 31 may be provided between the linear support part 29 and the inclined part 21 of the mounting bracket 5 by extending the area of a portion, in which the linear support part 29 and the inclined part 21 meet, in order to suppress bending of the mounting part 19 with respect to the linear support part 29.

Although the present disclosure has been illustrated and described with reference to specific forms, it will be obvious to those skilled in the art that the present disclosure may be improved and modified in various ways without departing from the scope of the technical concept of the present disclosure.

What is claimed is:

1. A structure for mounting an electronic sound generator (ESG) in a vehicle, the structure comprising:
    an ESG located inside a cowl space of a vehicle body; and
    a mounting bracket configured to fix the ESG to members defining the cowl space,
    wherein the mounting bracket comprises a plurality of fixation parts fixed to the members and a mounting part to which the ESG is fixed, and
    wherein fixation part of the plurality of fixation parts of the mounting bracket are fixed to a position corresponding to one side of a virtual restriction wall obtained by extending, along a longitudinal direction of the cowl space, a view volume formed by perpendicularly projecting the ESG to an inner surface of the cowl space along a vibration direction, in which the ESG fixed to the mounting part is configured to vibrate and generate a target sound, so as not to overlap the virtual restriction wall.

2. The structure of claim 1, wherein the cowl space is formed by a lower cowl panel providing a valley-shaped cross-section that forms a water channel at a lower portion thereof, an upper cowl panel connected to a rear upper portion of the lower cowl panel so as to support a lower portion of a windshield glass, and an upper cowl cover connected to a front upper portion of the lower cowl panel so as to support a bottom end of the windshield glass, and
    wherein the fixation parts of the mounting bracket are fixed to the upper cowl panel and the lower cowl panel.

3. The structure of claim 2, wherein the fixation parts of the mounting bracket comprises a first fixation part fixed to the upper cowl panel and a second fixation part fixed to the lower cowl panel, and
    wherein the mounting part of the mounting bracket is extended from the first fixation part to a front of the vehicle body.

4. The structure of claim 3, further comprising: an inclined part provided between the first fixation part and the mounting part of the mounting bracket so as to position the mounting part below the first fixation part, thereby forming a space above the mounting part,
    wherein the inclined part has a plurality of beads configured to increase rigidity between the mounting part and the first fixation part.

5. The structure of claim 4, wherein an upper surface of the first fixation part of the mounting bracket is bonded to a lower surface of the upper cowl panel, and
    wherein the second fixation part of the mounting bracket is bonded to a front surface of a rear wall that forms the water channel of the lower cowl panel.

6. The structure of claim 5, wherein the first fixation part and the second fixation part of the mounting bracket are linearly connected by a linear support part while maintaining a same cross-section thereof.

7. The structure of claim 6, further comprising: an extension support part formed between the linear support part and the inclined part of the mounting bracket, the extension support part configured to suppress bending of the mounting part with respect to the linear support part.

8. A structure for mounting an electronic sound generator (ESG) in a vehicle, the structure comprising:
    a lower cowl panel having a valley-shaped cross-section that forms a water channel;
    an upper cowl panel connected to a rear upper portion of the lower cowl panel and configured to support a lower portion of a windshield glass;
    an upper cowl cover connected to a front upper portion of the lower cowl panel and configured to support a bottom end of the windshield glass, wherein the upper cowl cover forms a closed cross-section together with the lower cowl panel and the upper cowl panel;
    an ESG fixed to be positioned within the closed cross-section; and
    a mounting bracket fixed to a rear wall of the lower cowl panel and a lower surface of the upper cowl panel and configured to fix the ESG within the closed cross-section.

9. The structure of claim 8, wherein the mounting bracket comprises a first fixation part fixed to the upper cowl panel, a second fixation part fixed to the lower cowl panel, and a mounting part fixing the ESG, which are integrally formed.

10. The structure of claim 9, wherein the first fixation part and the second fixation part of the mounting bracket are fixed only to a position corresponding to one side of a virtual restriction wall obtained by extending, along a longitudinal direction of a cowl, a view volume formed by perpendicularly projecting the ESG to an inner surface of the closed cross-section along a vibration direction of the ESG so as not to cross or overlap the virtual restriction wall.

11. The structure of claim 10, wherein the first fixation part and the second fixation part of the mounting bracket are linearly connected by a linear support part.

12. The structure of claim 11, further comprising: an inclined part provided between the first fixation part and the mounting part of the mounting bracket and configured to position the mounting part below the first fixation part, thereby forming a space above the mounting part.

13. The structure of claim 12, further comprising: an extension support part formed between the linear support part and the inclined part of the mounting bracket and configured to suppress bending of the mounting part with respect to the linear support part.

* * * * *